United States Patent
Sivasiva Ganesan et al.

(10) Patent No.: US 11,632,810 B2
(45) Date of Patent: Apr. 18, 2023

(54) TRANSPARENT INTEGRATION OF 3GPP NETWORK INTO TSN BASED INDUSTRIAL NETWORK

(71) Applicant: NOKIA TECHNOLOGIES OY, Espoo (FI)

(72) Inventors: Rakash Sivasiva Ganesan, Unterhaching (DE); Peter Rost, Heidelberg (DE); Christian Markwart, Munich (DE); Borislava Gajic, Unterhaching (DE); Andreas Maeder, Würzburg (DE); Christian Mannweiler, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/976,200

(22) PCT Filed: Feb. 28, 2018

(86) PCT No.: PCT/EP2018/054916
§ 371 (c)(1),
(2) Date: Aug. 27, 2020

(87) PCT Pub. No.: WO2019/166081
PCT Pub. Date: Sep. 6, 2019

(65) Prior Publication Data
US 2021/0007160 A1 Jan. 7, 2021

(51) Int. Cl.
*H04W 76/12* (2018.01)
*H04W 8/00* (2009.01)
(Continued)

(52) U.S. Cl.
CPC ........... *H04W 76/12* (2018.02); *H04W 8/005* (2013.01); *H04W 28/0268* (2013.01); *H04W 28/24* (2013.01); *H04W 48/16* (2013.01)

(58) Field of Classification Search
CPC ..... H04W 84/12; H04W 88/06; H04W 12/06; H04W 24/02; H04W 76/10; H04W 12/08;
(Continued)

(56) References Cited

U.S. PATENT DOCUMENTS 8,156,551 B2 * 4/2012 Mirza-Baig ......... H04L 63/0227
726/13
8,340,095 B2 * 12/2012 Fernandez Gutierrez ...................
H04L 12/1868
370/390
(Continued)

FOREIGN PATENT DOCUMENTS

CA 2821338 A1 * 6/2012 ............ H04W 8/005
CN 1528081 A 9/2004
(Continued)

OTHER PUBLICATIONS

Avnu Alliance™ Best Practices Theory of Operation for TSN-enabled Systems Applied to Industrial Markets, Revision 1.0, by Gardiner, dated Feb. 28, 2017, 71 pages.*
(Continued)

*Primary Examiner* — Mahendra R Patel
(74) *Attorney, Agent, or Firm* — Alston & Bird LLP

(57) ABSTRACT

It is provided a method, comprising triggering a terminal of a wireless network to establish a control session to a translator device via the wireless network; providing a control port to a station of a wireline network; forwarding at least one of a first message from the station received on the control port via the control session to the translator device and a second message received via the control session from the translator device to the station.

18 Claims, 9 Drawing Sheets

(51) Int. Cl.
  *H04W 28/02* (2009.01)
  *H04W 28/24* (2009.01)
  *H04W 48/16* (2009.01)

(58) Field of Classification Search
  CPC ..... H04W 76/27; H04W 28/06; H04W 48/18;
    H04W 4/18; H04W 36/14; H04W 88/04;
    H04W 88/16; H04W 56/00; H04W 92/02;
    H04W 92/18; H04W 80/04; H04W 24/04;
    H04W 60/00; H04W 36/18; H04W
    56/0015; H04W 40/02; H04W 64/006;
    H04W 92/20; H04W 76/20; H04W
    84/047; H04W 8/183; H04W 80/00;
    H04W 8/04; H04W 8/245; H04W 76/18;
    H04W 4/70; H04W 76/12; H04W 8/005;
    H04W 28/0268; H04W 28/24; H04W
    48/16; H04L 47/805
  USPC .......................................................... 370/329
  See application file for complete search history.

(56) References Cited

U.S. PATENT DOCUMENTS

| | | | | |
|---|---|---|---|---|
| 9,271,290 | B2* | 2/2016 | Pelletier | H04W 88/06 |
| 2003/0028671 | A1 | 2/2003 | Mehta et al. | |
| 2004/0266478 | A1* | 12/2004 | King | H04M 1/725 |
| | | | | 455/554.2 |
| 2007/0025301 | A1* | 2/2007 | Petersson | H04L 47/193 |
| | | | | 370/338 |
| 2007/0110083 | A1* | 5/2007 | Krishnamoorthy | H04L 12/66 |
| | | | | 370/466 |
| 2008/0084879 | A1 | 4/2008 | Mirza-Baig | |
| 2008/0273486 | A1* | 11/2008 | Pratt | H04L 12/403 |
| | | | | 370/328 |
| 2010/0322252 | A1* | 12/2010 | Suganthi | H04L 67/06 |
| | | | | 709/237 |
| 2011/0111767 | A1 | 5/2011 | Livanos | |
| 2011/0286437 | A1 | 11/2011 | Austin et al. | |
| 2014/0105003 | A1* | 4/2014 | Austin | H04M 15/8271 |
| | | | | 370/229 |
| 2014/0109209 | A1* | 4/2014 | Haynes | H04L 63/08 |
| | | | | 726/7 |
| 2015/0201443 | A1* | 7/2015 | Emani | H04W 76/14 |
| | | | | 370/338 |
| 2018/0006956 | A1* | 1/2018 | Bush | H04Q 9/00 |

FOREIGN PATENT DOCUMENTS

| | | | | |
|---|---|---|---|---|
| CN | 102301681 | A * | 12/2011 | ....... H04L 29/12405 |
| CN | 103227743 | A | 7/2013 | |
| CN | 104754654 | A | 7/2015 | |
| CN | 104756462 | A * | 7/2015 | ......... H04L 61/2589 |
| WO | WO-2005107179 | A1 * | 11/2005 | ............. H04L 45/02 |
| WO | WO-2018182688 | A1 * | 10/2018 | |

OTHER PUBLICATIONS

"3rd Generation Partnership Project; Technical Specification Group Services and System Aspects; Study on Communication for Automation in Vertical Domains (Release 16)" 3GPP TR 22.804 v0.3.0 (Nov. 2017), 137 pages.

"3rd Generation Partnership Project; Technical Specification Group Services and System Aspects; System Architecture for the 5G System; Stage 2 (Release 15)" 3GPP TS 23.501 v15.0.0 (Dec. 2017), 181 pages.

"IEEE 802.1Qcc, Stream Reservation Protocol (SRP) Enhancements and Performance Improvements" [online] [Retrieved Sep. 22, 2020]. Retrieved from the Internet: <URL: http://www.ieee802.org/1/pages/802.1cc.html>. (2018) 12 pages.

Gardiner et al., "Theory of Operation for TSN-enabled Systems Applied to Industrial Markets", Avnu Alliance Best Practices (Feb. 28, 2017), 71 pages.

Hummen et al., "TSN—Time Sensitive Networking", White Paper, Hirschmann (2017) 12 pages.

IEEE 802.1 [online] [Retrieved Sep. 24, 2020]. Retrieved from the Internet: <URL: https://web.archive.org/web/20171219214536/http://www.ieee802.org:80/1/>. (Dec. 19, 2017) 5 pages.

International Search Report and Written Opinion for Application No. PCT/EP2018/054916 dated Oct. 23, 2018, 21 pages.

First Examination Report for Indian Application No. 202047040540 dated Sep. 6, 2021, 11 pages.

"Next Generation Protocols (NGP); Mobile Deterministic Networking", ETSI GS NGP 008 v0.0.2, (Nov. 2017), 16 pages.

Gutierrez et al., "Self-Configuration of IEEE 802.1 TSN Networks", 2017 22nd IEEE International Conference on Emerging Technologies and Factory Automation (ETFA), (Jan. 8, 2018), 8 pages.

Office Action for European Application No. 18708960.2 dated Dec. 7, 2022, 18 pages.

Qualcomm Incorporated, "FS_5GLAN Editorial Clean-Up", 3GPP TSG-SA WG1 Meeting #81, S1-180557, (Feb. 5-9, 2018), 40 pages.

Office Action for Chinese Application No. 201880092069.8 dated Feb. 18, 2023, 16 pages.

* cited by examiner

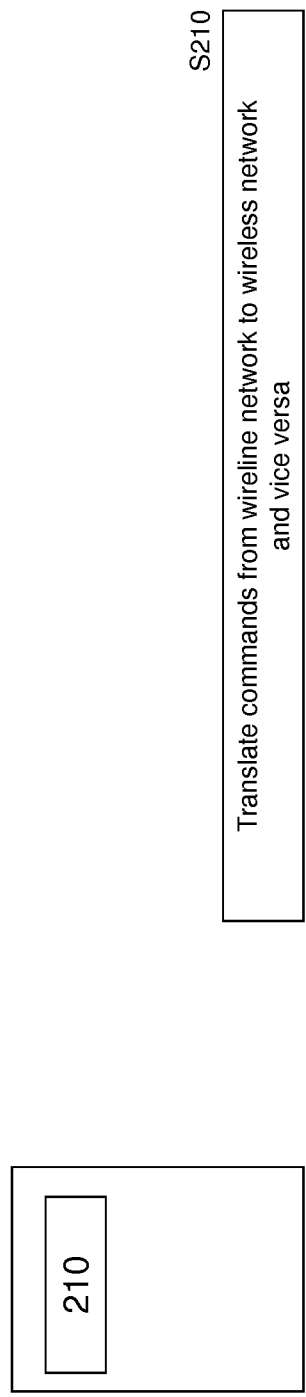

TRANSPARENT INTEGRATION OF 3GPP NETWORK INTO TSN BASED INDUSTRIAL NETWORK

CROSS-REFERENCE TO RELATED APPLICATIONS

This application is a national phase entry of International Application No. PCT/EP2018/054916, filed Feb. 28, 2018, the entire contents of which are incorporated herein by reference.

FIELD OF THE INVENTION

The present invention relates to an apparatus, a method, and a computer program product related to transparent integration of a wireless network (e.g. a 3GPP network) into a wireline network (e.g. a TSN network).

BACKGROUND OF THE INVENTION

Time sensitive networking (TSN) [1] is being standardized by IEEE (Institute of Electrical and Electronics Engineers) 802.1 to provide industrial networks with deterministic delay to handle time sensitive traffic. Currently, wired links are assumed for connecting the sensors and controllers. Moving from wired to wireless sensors and actuators provide advantages, such as mobility, scalability, low cost maintenance etc. To connect the wireless devices to a TSN network, wireless transmission mechanisms such as defined in 3GPP (3$^{rd}$ Generation Partnership Project) are necessary.

FIG. 1 shows the entities involved in TSN. One of the key consideration for TSN standardization is to have a centralized entity, named CNC (Centralized Network Controller), which collects the requirements of end to end communication between the Talker End Stations and Listener End Stations and performs scheduling centrally. The Bridges learn the connection information for their immediate network peer in each physical port using the link layer discovery protocol (LLDP). Each TSN network has a single CNC. In addition, there might be multiple centralized user configurators (CUCs) which translate the requirements of the end to end communication and communicate it to the CNC. Furthermore, the CUC is responsible for configuring the respective Talker and Listener End Stations with transmission parameters computed by the CNC during the scheduling process. The solid arrows in FIG. 1 describe the main steps 1-6 involved in establishing a communication between a Talker and a Listener End Station [2].

Namely, according to 1), CUC obtains the stream Quality of Service (QoS) from the endstations. Then, according to 2) CUC provides the stream QoS requirements to CNC. In 3a) CNC calculates schedules, paths etc. in order to fulfil the stream QoS requirements, which are reported to CUC in 3b). In 4a) and 4b), CUC configures, via CNC, the managed objects of the bridges accordingly. CNC informs in 4c) CUC about successful configuration of the bridges. Namely, Stream Trans. Info contains the configuration parameters that the Talker End Station needs to use e.g. destination MAC address, VLAN ID and PCP field. It also has the transmit time window in which the Talker should transmit and the receive time window in which the listener should expect to receive the packets.

Then, in 5) CUC configures the end stations accordingly. In parallel, as shown by dashed lines in FIG. 1, network discovery procedures run between related entities (i.e., between neighboured bridges, between each bridge and CNC, between CNC and CUC, and between each station and the respective bridge it is connected to). After that, in 6), transmission between talker end stations and listener end stations may be performed.

Note that the bridges are time-aware in a TSN network. There may be one or more bridges between a talker end station and a respective listener end station. In FIG. 1, two bridges are shown as an example. Each talker end station may talk to one or more listener end stations, and each listener end station may listen to one or more talker end stations. A listener end station of one communication may be a talker end station of another communication.

Currently, in industries, TSN is used as a mechanism to provide end to end connectivity with deterministic capacity and delay. The talkers (e.g., sensors, controllers) and listeners (e.g. controllers, actuators) are connected through bridges using cables.

Time sensitive networking (TSN) [1] is currently standardized as the mechanism for communication within industrial networks. A set of IEEE 802.1 protocols [3] (IEEE 802.1AS-Rev, 802.1CB, 802.1Qcc, 802.1Qch, 802.1Qci, 802.1Qcj, 802.1CM, 802.1Qcp, 802.1Qcr, 802.1AB) is applied to achieve deterministic data transmission with guaranteed low latency with time-aware devices (which need to be configured properly).

3GPP started in 2017 a study on communication for Automation in Vertical Domains to identify respective requirements for wireless communication [4], [5]. So far, neither 3GPP Rel. 15 nor Rel. 16 include solutions on integrating 3GPP networks with TSN.

REFERENCES

[1] R. Hummen, S. Kehrer, O. Kleineberg, "TSN—Time Sensitive Networking", White Paper, Hirschmann
[2] IEEE 802.1Qcc, Stream Reservation Protocol (SRP) Enhancements and Performance Improvements, http://www.ieee802.org/1/pages/802.1cc.html
[3] http://www.ieee802.org/1/[4]
[4] 3GPP, TS 23.501 V15.0.0 "System Architecture for the 5G System; Stage 2 (Release 15)", December 2017
[5] 3GPP TR 22.804 V0.3.0 "Study on Communication for Automation in Vertical Domains (Release 16)", December 2017
[6] E. Gardiner et al., "Theory of Operation for TSN-enabled Systems applied to Industrial Markets", Avnu Alliance, 2017

SUMMARY OF THE INVENTION

It is an object of the present invention to improve the prior art.

According to a first aspect of the invention, there is provided an apparatus, comprising means for triggering configured to trigger a terminal of a wireless network to establish a control session to a translator device via the wireless network; means for providing configured to provide a control port to a station of a wireline network; first means for forwarding configured to forward at least one of a first message from the station received on the control port via the control session to the translator device and a second message received via the control session from the translator device to the station.

The means for providing may provide the control port as a blocked security port, wherein the blocked security port is open for authentication related communication and blocked for another communication; the message from the station may be a request for authentication by the wireline network; and the apparatus may further comprise first means for monitoring configured to monitor if an authentication response is received in the control session, wherein the authentication response indicates that the wireline network authenticates the station; means for opening configured to open the control port for the other communication if the authentication response is received.

The apparatus may further comprise second means for monitoring configured to monitor if device physical port information is received via the control session; second means for forwarding configured to forward the device physical port information to the station if the device physical port information is received.

The apparatus may further comprise third means for monitoring configured to monitor if station physical port information is received from the station; third means for forwarding configured to forward the station physical port information to the translator device via the control session if the station physical port information is received.

The apparatus may further comprise third means for monitoring configured to monitor if a bridge configuration parameter is received via the control session; means for configuring configured to configure a data port according to the bridge configuration parameter, wherein the data port is configured for data transmission to and from the station.

The means for triggering may be configured to trigger the terminal to establish a connection via the wireless network to the translator device prior to triggering to establish the control session.

According to a second aspect of the invention, there is provided an apparatus, comprising first means for monitoring configured to monitor if a network discovery request is received from a wireline network, wherein the network discovery request requests an indication about a quality of service on a connection to a station of the wireline network; first means for translating configured to translate the network discovery request into a request for providing a data session of a wireless network having a requested quality of service; first means for forwarding configured to forward the request for providing the data session to the wireless network; second means for translating configured to translate a first indication of a provided quality of service of the data session comprised in a response to the request for providing the data session received from the wireless network into a second indication of the provided quality of service of the data session; means for responding configured to respond to the network discovery request by a response to the network discovery request, means for informing configured to inform a translator client on the provided quality of service of the data session via a control session established through the wireless network to the translator client; wherein the response to the network discovery request comprises the second indication about the provided quality of service of the data session. The requested quality of service may be predefined.

The apparatus may further comprise means for requesting configured to request, via a control session to the translator client, an indication of a port at the translator client, wherein the port is provided for communication with the station; wherein the response to the network discovery request may comprise the second indication about the provided quality of service of the data session, and an identifier of the port.

The apparatus may further comprise second means for monitoring configured to monitor if a first request for a modification of the data session is received from the wireline network; third means for translating configured to translate the first request for the modification into a second request for the modification according to the wireless network; second means for forwarding configured to forward the second request for modification to the wireless network; means for informing configured to inform the translator client on the modification.

The apparatus may further comprise third means for monitoring configured to monitor if at least one of device physical port information and a bridge configuration parameter is received from a first device of the wireline network; third means for forwarding configured to forward the at least one of the device physical port information and the bridge configuration parameter to the translator client if the at least one of device physical port information and the bridge configuration parameter is received.

The at least one of the device physical port information and the bridge configuration parameter may comprise the bridge configuration parameter, and the apparatus may further comprise means for configuring configured to configure a data port according to the bridge configuration parameter, wherein the data port is configured for data transmission to and from the wireline network.

The apparatus may further comprise fourth means for monitoring configured to monitor if station physical port information is received from the translator client; fourth means for forwarding configured to forward the station physical port information to a second device of the wireline network if the station physical port information is received.

According to a third aspect of the invention, there is provided an apparatus, comprising first means for translating configured to translate at least one of commands received from a bridge and a station, respectively, of a wireline network into corresponding commands to a wireless network and commands received from the wireless network into corresponding commands to the bridge and the station, respectively, of the wireline network, wherein from a perspective of the wireless network, the commands directed to the wireless network are commands from an application function running on the wireless network and the commands received from the wireless network are commands to the application function.

The apparatus may further comprise second means for translating configured to translate at least one of messages received from the bridge and the station, respectively, of the wireline network into corresponding messages to the wireless network and messages received from the wireless network into corresponding messages to the bridge and the station, respectively, of the wireline network, wherein from the perspective of the wireless network, the messages directed to the wireless network may be messages from a packet data network communicating with the wireless network and the messages received from the wireless network are messages to the packet data network.

According to a fourth aspect of the invention, there is provided a system, comprising a translator, wherein the translator apparatus comprises an apparatus according to the third aspect; and a translator client, wherein the translator client comprises an apparatus according to the third aspect; wherein the wireless network of the translator is the same as the wireless network of the translator client; the translator client is configured to translate the command from the station into a corresponding first intermediate command of the wireless network; the translator is configured to translate the first intermediate command into the corresponding command to the bridge; the translator is configured to translate the command from the bridge into a corresponding second intermediate command of the wireless network; and the translator client is configured to translate the second intermediate command into the corresponding command to the station.

In the apparatus according to any of the first to third aspects, at least one of the wireline network may be a time sensitive network, and the wireless network may be a 3GPP network.

According to a fifth aspect of the invention, there is provided a method, comprising triggering a terminal of a wireless network to establish a control session to a translator device via the wireless network; providing a control port to a station of a wireline network; forwarding at least one of a first message from the station received on the control port via the control session to the translator device and a second message received via the control session from the translator device to the station.

According to a sixth aspect of the invention, there is provided a method, comprising monitoring if a network discovery request is received from a wireline network, wherein the network discovery request requests an indication about a quality of service on a connection to a station of the wireline network; translating the network discovery request into a request for providing a data session of a wireless network having a requested quality of service; forwarding the request for providing the data session to the wireless network; translating a first indication of a provided quality of service of the data session comprised in a response to the request for providing the data session received from the wireless network into a second indication of the provided quality of service of the data session; responding to the network discovery request by a response to the network discovery request, informing a translator client on the provided quality of service of the data session via a control session established through the wireless network to the translator client; wherein the response to the network discovery request comprises the second indication about the provided quality of service of the data session.

Each of the methods of the fifth and sixth aspects may be a method of transparent integration.

According to a seventh aspect of the invention, there is provided a computer program product comprising a set of instructions which, when executed on an apparatus, is configured to cause the apparatus to carry out the method according to any of the fifth and sixth aspects. The computer program product may be embodied as a computer-readable medium or directly loadable into a computer. The medium may be a non-transitory computer readable medium.

According to some embodiments of the invention, at least one of the following advantages may be achieved:

flexibility (in terms of mobility) of the TSN network is enhanced;
scalability (in terms of number of sensors or actuators) is enhanced;
modifications to the TSN network and the 3GPP network are not required.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 11 shows an apparatus according to an embodiment of the invention;

FIG. 12 shows a method according to an embodiment of the invention; and

FIG. 13 shows an apparatus according to an embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

In a main target scenario, the tactile industrial network, also known as Industrial IoT (IIoT) or Industry 4.0 networks, 3GPP technologies are applied in addition to wired time sensitive networking (TSN) in industrial environments to provide flexibility (in terms of mobility) and scalability (in terms of number of sensors or actuators).

The introduction of wireless devices provides more flexibility, cost effectiveness and scalability in the system, but requires for example a wireless network as defined by 3GPP to provide predictable QoS for the communication. TSN and 3GPP networks are developed and standardized as two disjoint domains which are managed independently. To support a wireless connection based on 3GPP technology, only either of these two standards is supported in a network. There are no over-arching entities or concepts developed in order to handle the interaction between these two domains.

Some embodiments of this invention enable a TSN End Station "A" that communicates with a TSN End Station "B" via a time sensitive communication link of a TSN Network to use a wireless communication service based on 3GPP technologies. A TSN Translator and a TSN Translator Client, which acts on behalf of the TSN Translator, are introduced as a new functionality to integrate a 3GPP network into the TSN network domain in a transparent manner. I.e., to the TSN network, the wireless communication service of a 3GPP network acts similar to a TSN bridge, while the TSN network acts as a data service to the 3GPP network.

Figure 1:
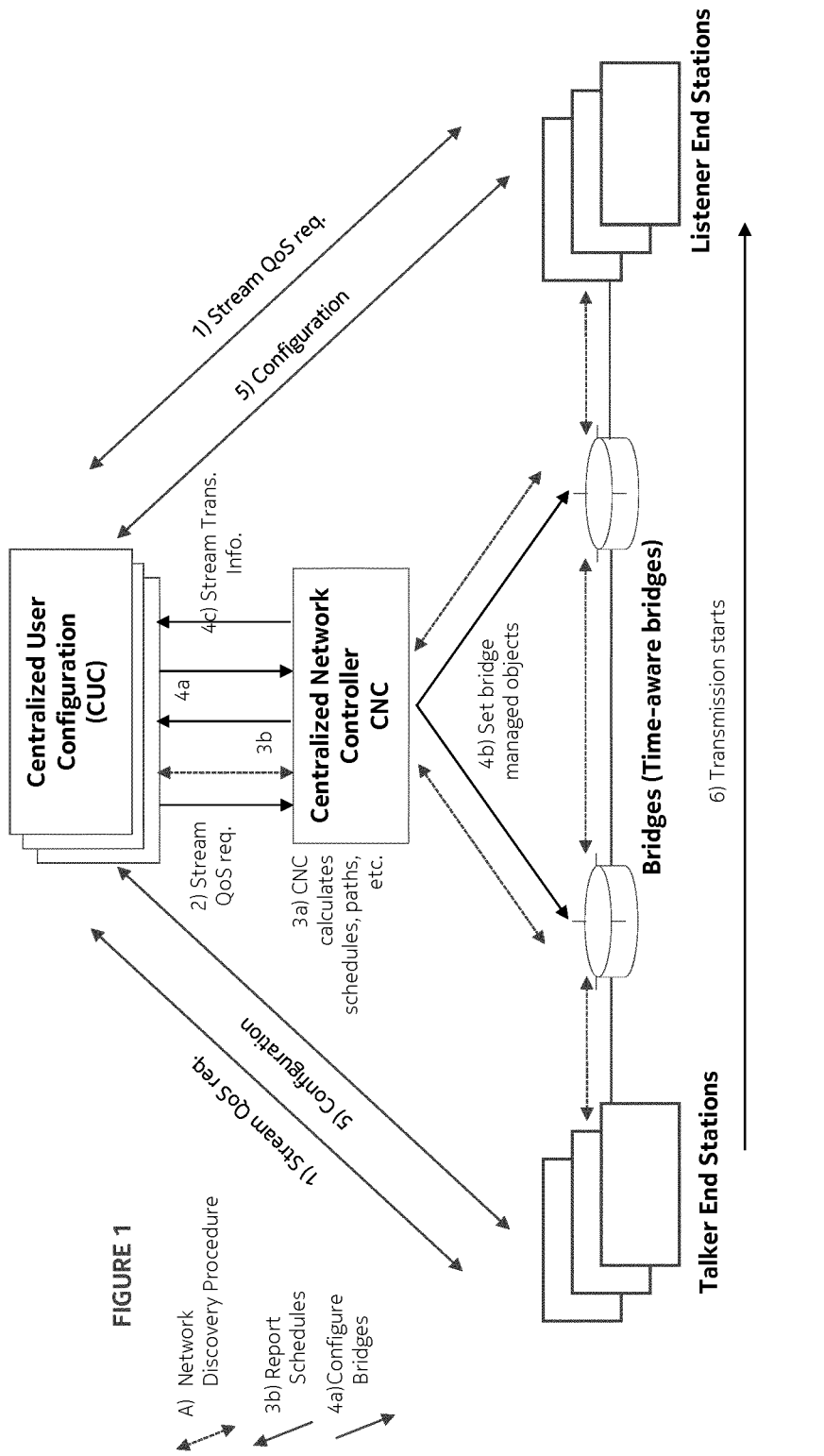
FIG. 1 shows a functional and simplified diagram of a TSN network including a flow of commands.
Figure 2:
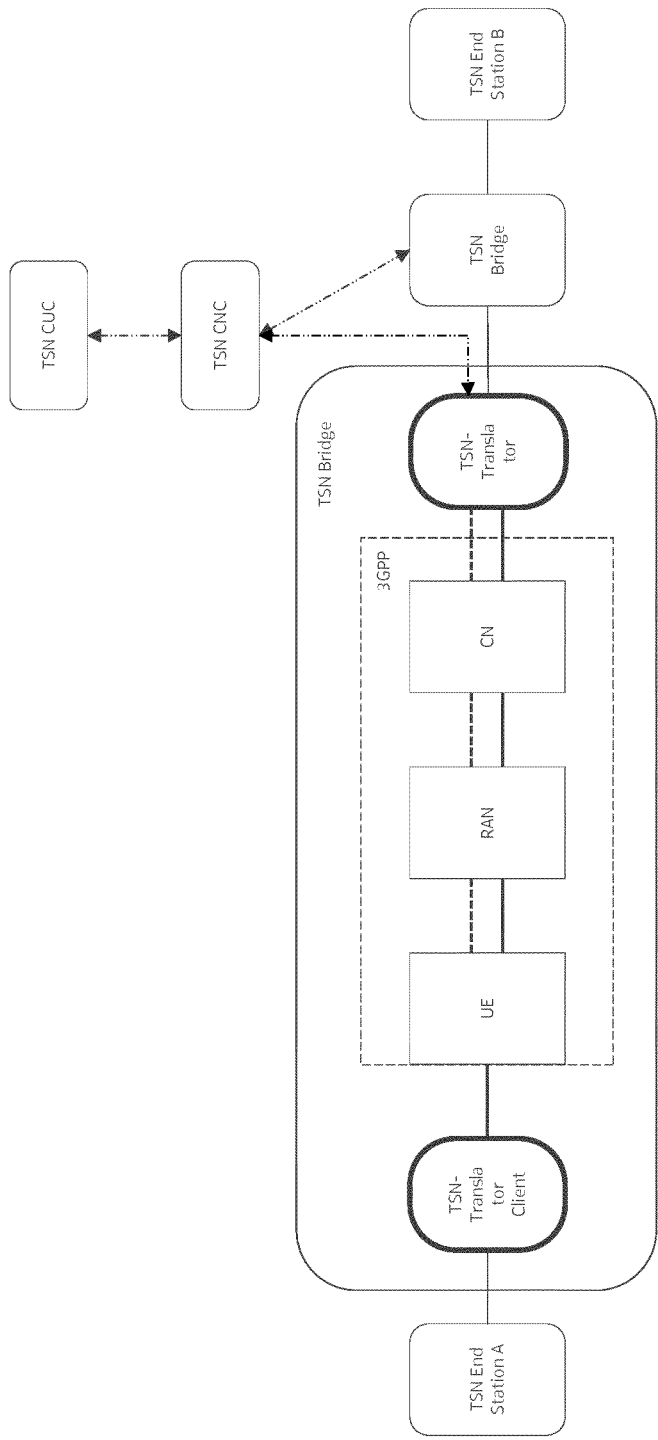
FIG. 2 shows a functional and simplified diagram of a TSN network according to an embodiment of the invention using a wireless communication service based on 3GPP.

FIG. 2 shows the general concept of the TSN Translator and its TSN Translator Client and how the TSN End Station A is connected to the TSN network via a wireless connection service provided by the 3GPP network. FIG. 2 corresponds to FIG. 1, but one of the bridges is replaced by the 3GPP network embedded between the TSN translator and the TSN translator client.

In FIG. 2 the entities of the TSN network are shown by round edged boxes and those of the 3GPP network are shown by sharp edged boxes. The UE, RAN and CN together constitute the 3GPP network which is enclosed within a dashed line box. The solid lines connecting the entities represent the data plane and the dotted lines the control plane. The TSN translator and TSN translator client shown by bold rounded boxes enable the transparent integration of the TSN network and the 3GPP network. The round edged box consisting of TSN translator, TSN translator client, and 3GPP network constitute the logical TSN bridge formed on top of the 3GPP network. Note: For simplicity, the communication paths of the TSN CUC with the TSN End Stations A and B are not shown in FIG. 2.

The TSN End Station A is connected to a UE via the TSN Translator Client. The UE is responsible to establish and handle the wireless connection service for the TSN End station A. The wireless connection service contains beside the wireless link between UE and Radio Access Network (RAN) also essential Core Network (CN) services to provide for example authentication, mobility, QoS, etc.

For the transparent usage of the wireless connection service and to hide specific behavior of the 3GPP network to the TSN network and vice versa, a novel TSN translator function is introduced, which works as an intermediator between both domains, i.e. it understands the TSN protocol and maps the TSN CUC and TSN CNC messages as well as the TSN network messages into control and user plane messages of the 3GPP network to trigger corresponding actions in the 3GPP network, e.g. to trigger the establishment of a wireless connection with guaranteed QoS, and vice versa. Furthermore, it takes cares of services like the enforcement of the priority classes for the traffic, frame translation, time gating etc which are typically offered by the bridges in the wired network to guarantee deterministic communication. With respect to this view, the TSN Translator and TSN Translator client are placed on both sides of the 3GPP network, the UE side and the CN side.

The TSN Translator and the TSN Translator Client are logically part of the same translation between 3GPP and TSN network and hence, it is beneficial that they do not act independently. Treating them as one entity allows to hide the TSN Translator at the UE side to the TSN network and to use the TSN Translator at the CN side to represent the complete 3GPP network as a TSN bridge to the TSN Network. This simplifies especially the configuration and handling at the TSN CNC and the respective TSN CUCs. The TSN translator performs the major part of the translation of the TSN protocols to 3GPP commands and procedures and vice versa. The TSN Translator client at the UE side acts on behalf of the TSN Translator at the CN side and is therefore called TSN Translator Client.

The integration of the TSN Translator with the TSN network is done by implementing the protocols for an TSN bridge, the TSN ethernet protocol to exchange messages between a TSN bridge with another TSN ethernet bridge or TSN End Station B (user plane traffic, also called data traffic) and the protocol to exchange information with the TSN CNC (control plane). Additionally, the respective communication of the TSN End Station A with the TSN CUC is also handled via the TSN Translator and its TSN Translator Client.

Typically, 3GPP network interfaces provide a set of functions which are defined for a specific 3GPP release. Therefore, the TSN Translator as well as the TSN Translator Client are designed to adapt to respective new releases. As long as a 3GPP release is not closed, 3GPP may introduce additional interfaces or adaptations to interfaces or even new functional entities which allows for optimizing or simplifying respective handling of the communication for TSN networks. An example for such an adaptation is the introduction of the new PDU session type "Ethernet" to handle ethernet traffic. The TSN Translator as well as the TSN Translator Client hide the release specifications to the TSN network. The same is valid for the 3GPP network when the TSN network introduces new functions and interface modifications.

Figure 3:
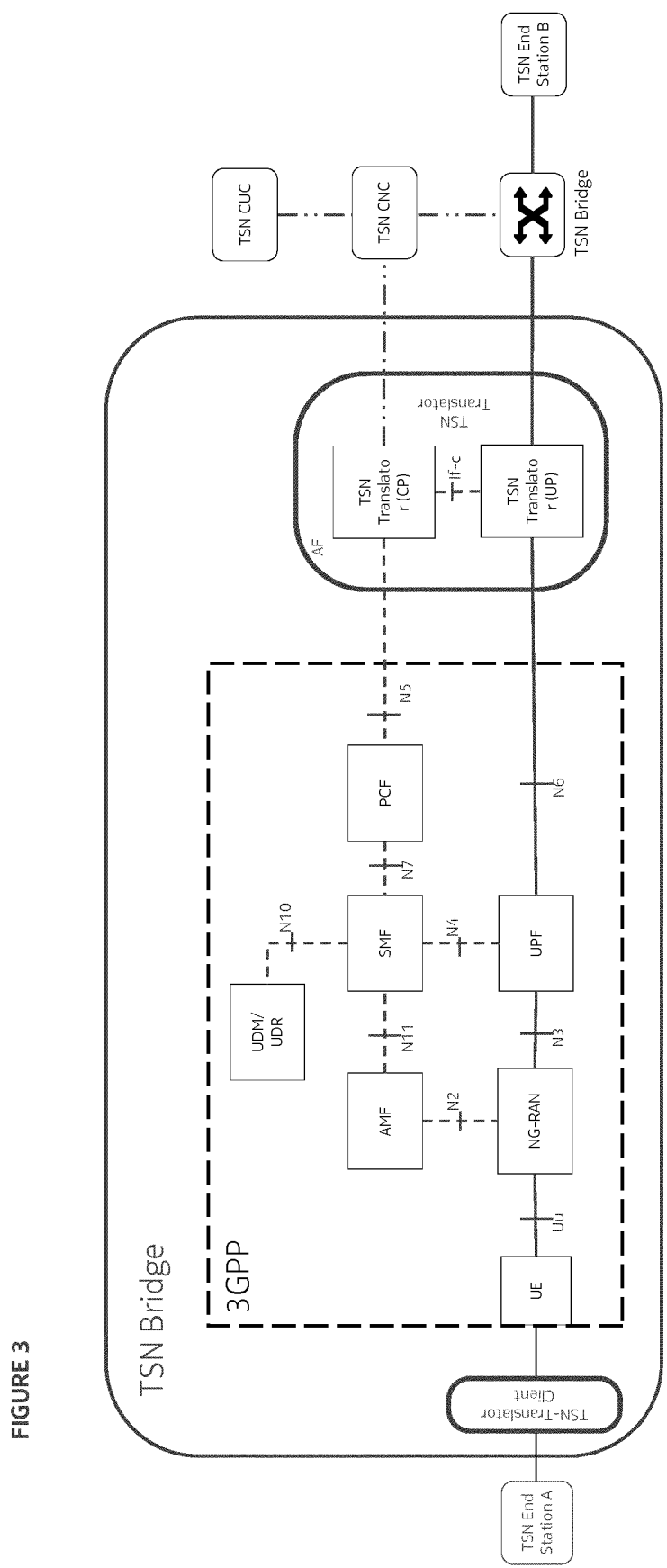
FIG. 3 shows an example implementation of a 3GPP network integrated into a TSN network according to an embodiment of the invention.

FIG. 3 shows an example implementation for integrating TSN network with a 3GPP network. The entities in the 3GPP network, shown within the dashed box labelled 3GPP, are possible functional entities resulting from the 3GPP release 15 standardization. This example could be mapped to other 3GPP releases or non-3GPP wireless networks. The TSN End Stations A and B could be a sensor, controller, actuator or any other industrial device. In this picture, UE is shown as a separate entity, however, it could be either integrated in the End Station A or can be plugged in to the TSN End Station. Similarly, the TSN Translator Client could also be an integrated part of TSN End Station A, UE, or both.

In FIG. 3, TSN Translator and its TSN Translator Client work as an intermediator between both domains, i.e., it understands the TSN protocol and the 3GPP protocols and maps the TSN commands and messages into corresponding actions and messages in a 3GPP network providing 5G and vice versa.

Two key types of information messages are differentiated by the TSN Translator:

1) The network configuration related messages of the TSN network we denote in the following by the term control plane (CP) (see also in FIG. 3) in order to be consistent with the naming convention of mobile network terminology. The CP messages, e.g. link layer discovery protocol messages are converted into the corresponding control plane messages and procedures in a 3GPP network. The control plane messages and procedures are used to establish for example a packet data unit (PDU) session or a service flow and to provide for example required QoS parameters for the service flow within the PDU session. The TSN translator has an interface to respective 3GPP functional entities of the core network (CN), e.g. in FIG. 3 the policy control function (PCF) of a 5G network, which interacts directly or indirectly with further 3GPP CN functional entities like Session Management Function (SMF) and Access & Mobility Management Function (AMF). The TSN Translator acts from the 3GPP network point of view as Application Function (AF) and uses the N5 interface. In addition, the TSN Translator derives information provided by its TSN Translator Client and the AF to act as a TSN Bridge in the TSN network. A typical example is the Link Layer Discovery protocol required at a TSN bridge to be interoperable with the TSN network.

Alternatively, other options, which are not shown in FIG. 3 may be used to interact between 3GPP CN and TSN Translator. The TSN Translator may provide an interface to the Network Exposure Function (NEF) when authentication and authorization features are needed, or a new functional entity in 3GPP domain could be created which provides the functionality of the TSN Translator in a standardized way. SBI (service based interfaces) may also be used to realize interfaces to the TSN Translator function.

2) For the transmission of data between the End Station A and End Station B, the TSN Translator has an interface to the User Plane Function (UPF) and the corresponding interface to the TSN Bridge that connects to the TSN End Station B, which we denote in the following by the term user plane (UP), again to align with the terminology applied in 3GPP networks. In FIG. 3, the UP of the TSN translator acts as a data network to the 3GPP network. On the other side, for the adjacent TSN Bridge and for CNC, it looks like a TSN bridge. With respect to the user plane functionality, the TSN translator shall offer the following functions:

a. Removes the header information from the IP packets received at UPF and create the corresponding TSN packet b. Maps the packets received in a particular PDU session to the packets to be transmitted from the corresponding egress port c. Depending on the QoS flow of the given PDU session, place the packet in the corresponding priority queue of a specific port d. Based on the gate control list specified by the CNC, it shall transmit the packets from one of the different queues through the egress port. The gate control list specifies at which time interval a packet from a specified priority queue can be transmitted at a particular egress port.

e. If the packet arrives delayed such that the gate control for this packet in the current interval is already closed, then this packet shall be dropped and not transmitted.

f. Shall introduce guard band between the transmission intervals g. Shall pre-empt the ethernet packets, which started its transmission in the previous time interval, in order to make the port be available for the packets scheduled to be transmitted at the current time interval Similar translation shall be performed when the TSN packets arrive at the TSN translator ingress ports. The priority queues shall be implemented at the translator or the translator client or both.

The UP part of the TSN Translator is realized either as:

a. UPF with extended TSN functionality: In this case, both UPF and TSN Translator UP are within a single box and intermediation between the UPF protocol and the TSN protocol is performed internally as shown in FIG. 3 or b. UPF and TSN translator UP act as two separate entities: In this case, interface between them is a proprietary interface or the N6 interface as defined by 3GPP is extended to support the TSN capabilities Similar to the TSN Translator, CP and UP translation is performed by the TSN Translator Client. The TSN Translator Client works on behalf of the TSN Translator so that the TSN Translator Client, 3GPP network and TSN Translator together appear to be a TSN bridge for the TSN network and the TSN End Station A. The TSN Translator Client offers a blocked security port to the TSN End Station A, so that the TSN End Station A can send authentication related messages to the TSN CNC.

The following functions are provided by the TSN Translator and its TSN Translator Client together with the 3GPP network to achieve transparent integration in the TSN network:

1. The TSN Translator and its TSN Translator Client are enabled to initiate PDU sessions and QoS flows with a set of pre-defined QoS parameter, e.g. 5G QoS indicator (5QI), in the 3GPP network, which are used to exchange information between TSN Translator Client and TSN Translator. The PDU sessions and respective QoS flows are used to transport information between:

[1] TSN End Station A and TSN CUC (e.g. authentication and authorization)

[2] TSN Translator and its TSN Translator Client (e.g. link layer discovery protocol)

[3] TSN End Station A and TSN End Station B (e.g. measurement data from a sensor to a controller)

2. The UE connected to the TSN Translator Client establishes the wireless connection to the 3GPP Core Network domain, based on standardized 3GPP authentication and authorization procedures. The TSN Translator Client, which is connected to the UE may provide additional credentials allowing to check if the UE and TSN Translator Client together are authorized to establish a wireless connection. Optionally, the TSN Translator Client provides further credentials of the connected TSN End Station A that is added to the credentials.

3. The 3GPP network allows to establish additional PDU sessions and QoS flows for existing and/or the new PDU sessions with a set of pre-defined QoS parameter (e.g. 5QI), which is controlled by a Policy Control Function PCF, optionally considering information provided by the TSN Translator and its TSN Translator Client on required minimum or average throughput, traffic pattern (e.g. cyclic data), maximum or average allowed packet loss, maximum or average latency, and jitter. A typical PDU session would define a maximum delay (10 ms) and further information, which needs to be guaranteed with high probability (99.999%) and minimum guaranteed bit rate (less than 1 Mbps). The information may be derived from information provided by the TSN network containing TSN CUC, TSN CNC, TSN End Stations A, and/or TSN End Station B.

4. The TSN Translator and its TSN Translator Client supports the Link Layer Discovery Protocol (LLDP) and participates in the network discovery procedure executed by the TSN CNC. The PDU session and the QoS flow represent the connection between the UE and the UPF. This information is mapped to TSN Bridge managed object's parameters, which are then reported by the TSN Translator to the TSN CNC.

5. The TSN Translator and its TSN Translator Client has at least one of the following functions:

[1] Mapping of control plane information from the TSN network and the TSN End Stations to 3GPP control plane information

[2] Mapping of control plane information from the TSN network and the TSN End Stations to information exchanged between TSN Translator and it's TSN Translator Client

[3] Mapping of control plane information from the 3GPP network to information exchanged between TSN Translator and TSN Translator Client, and TSN network and the TSN End Stations

[4] Handling of TSN user plane, including the time gating at the egress port and the ingress port

[5] Handling of Time Synchronization in the TSN network

[6] Access control for TSN end station

6. The 3GPP network may provide multiple PDU sessions for the UE connected to the TSN Translator Client to realize at least one wireless connection in the 3GPP network. Each PDU session may contain multiple QoS flows with a defined set of QoS parameters for each. The TSN Translator and its TSN Translator Client maps each QoS session and its QoS parameters to TSN Bridge managed object's parameters and reports them to the TSN CNC to allow more flexible options for the computed schedule.

Figure 4:
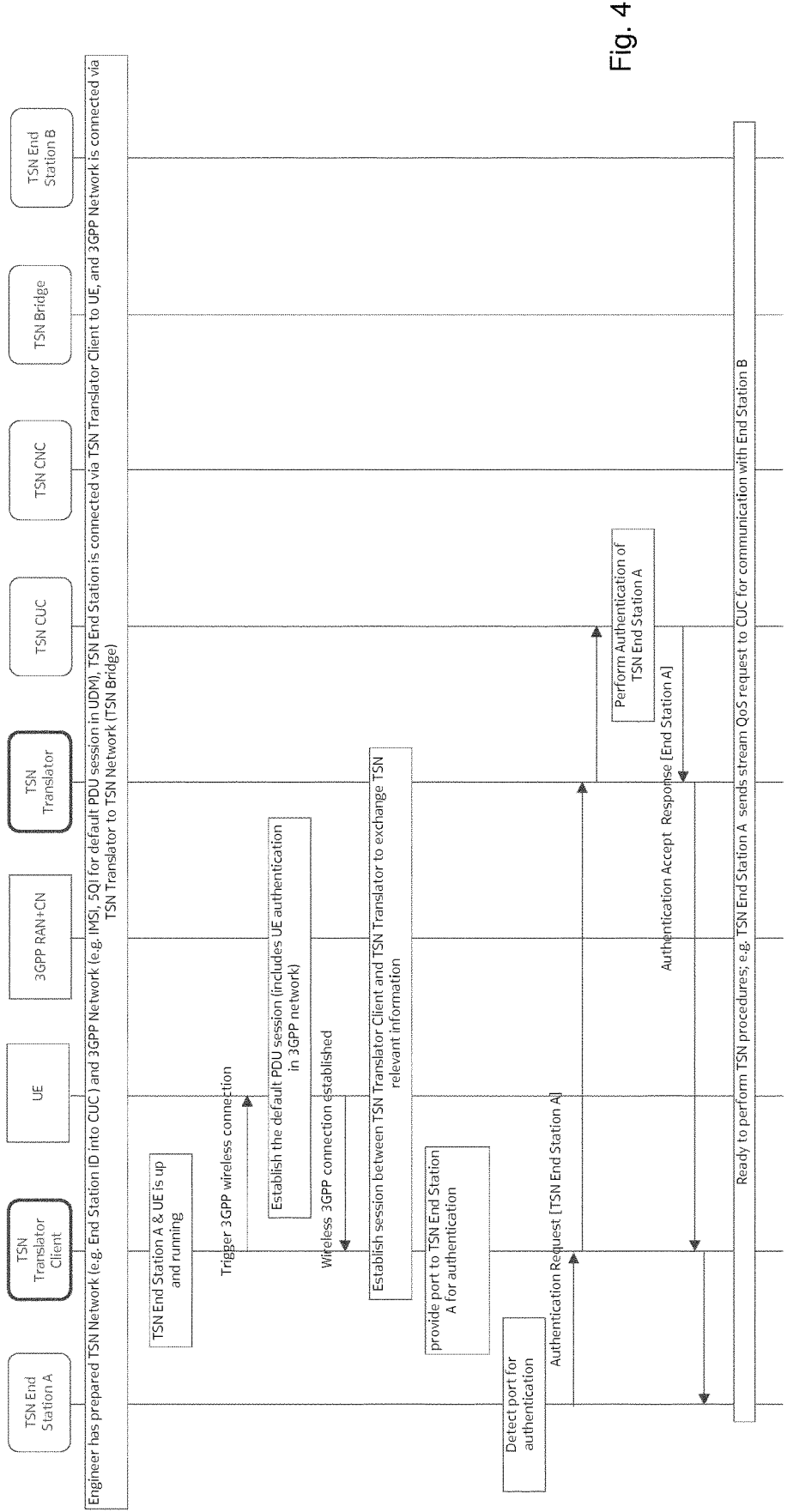
FIG. 4 shows an example flow diagram for initial setup of the TSN network integrating the 3GPP network according to an embodiment of the invention.
Figure 5:
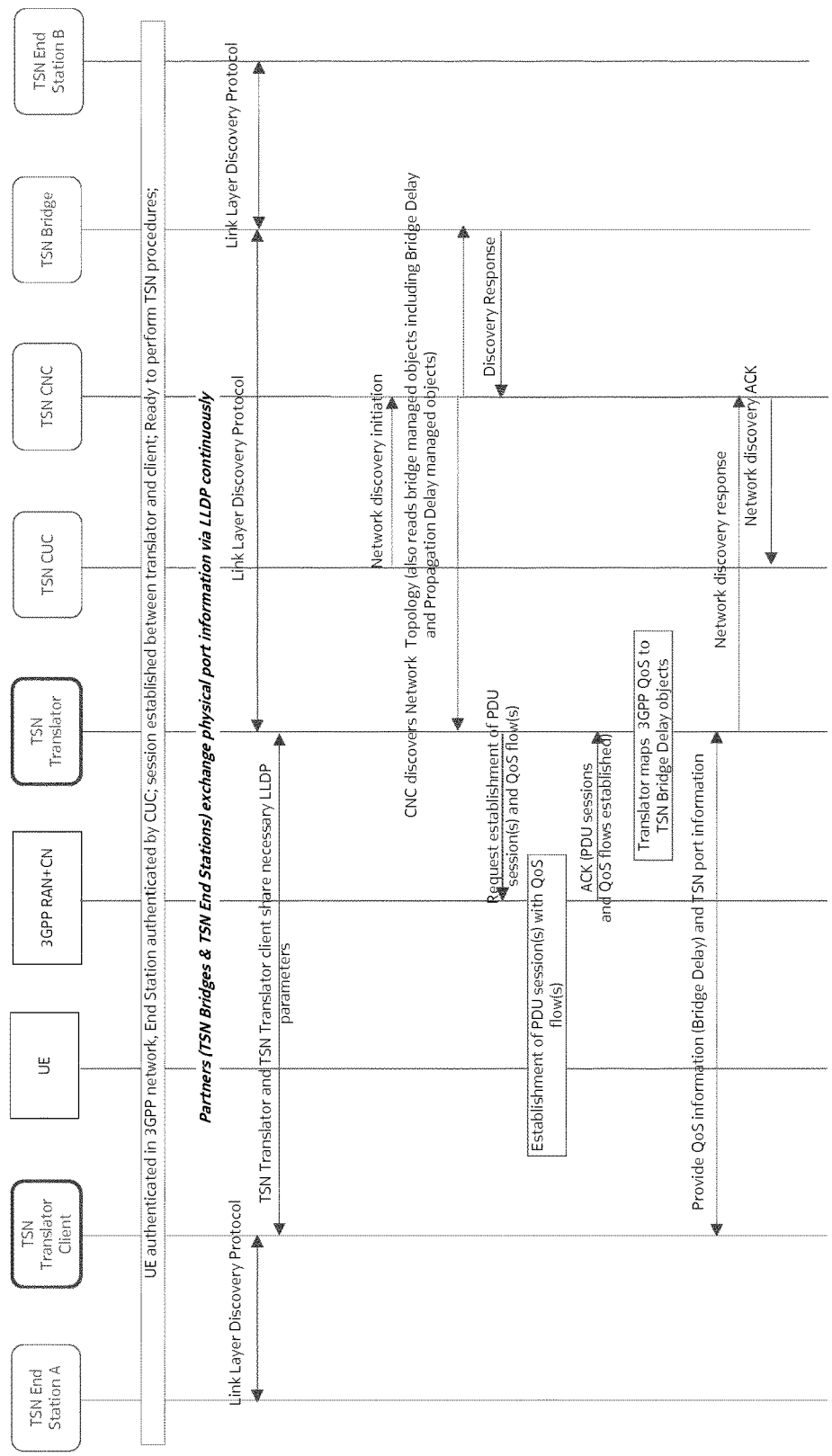
FIG. 5 shows an example flow diagram for network discovery of the TSN network integrating the 3GPP network according to an embodiment of the invention.
Figure 6:
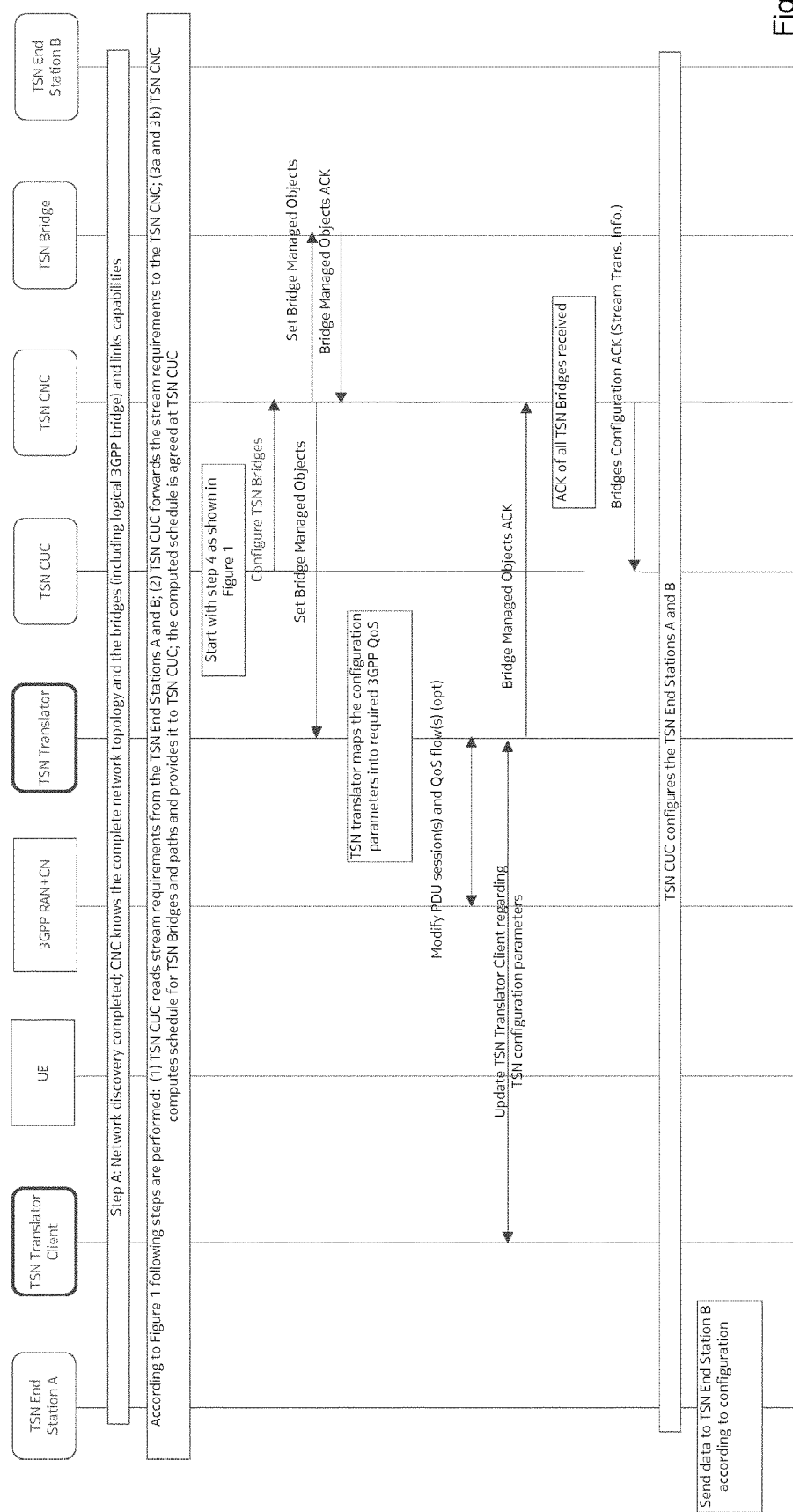
FIG. 6 shows an example flow diagram for establishment of an end-to-end communication through the TSN network integrating the 3GPP network according to an embodiment of the invention.

FIGS. 4, 5, and 6 shows in an exemplary way how the TSN Translator and its TSN Translator Client interact with the 3GPP network and its entities when providing a wireless communication service to a TSN network and its TSN entities. For simplification and a better understanding, it is assumed that the CP traffic is handled in a default PDU session with respective QoS flow(s) and a second PDU session with respective QoS flows handles the UP traffic. FIG. 4 illustrates the initial setup of the 3GPP-TSN network, FIG. 5 illustrates the discovery of network entities in a TSN network, and FIG. 6 illustrates the establishment of an end to end communication between TSN End Station A and TSN End Station B.

The flow in FIG. 4 is as follows:

1. First an engineer or a configuration tool, which informs the TSN CUC regarding the devices that are allowed to connect to the network, enters the device information e.g. International Mobile Subscriber Identity (IMSI) into the UDM of the 3GPP network so that this user equipment (UE) can be connected successfully afterwards. For simplicity of the description, the case when the UE and the TSN End Station A are integrated as one device is considered. In this case, the IMSI represents also the TSN End Station A in the 3GPP network. Otherwise, the TSN translator may perform a mapping between the identifier of the station in the TSN network and the IMSI of the UE. In addition to the IMSI information, other information like QoS parameter (5QI) category of the TSN End Station A are also entered to the UDM.

2. When the TSN Translator Client detects that TSN End Station A and UE are up and running (e.g. switched on), the TSN Translator Client triggers the UE to establish a wireless connection with the 3GPP network. During the establishment of the wireless connection between the UE and the 3GPP radio access network (RAN) and CN, the UE is authenticated by the 3GPP network. It is authenticated using the information registered in Authentication Server Function (AUSF) and admitted to a pre-defined default PDU session and QoS flow. The establishment of this default PDU session takes place in accordance with the 3GPP standardized procedures.

3. The default PDU session and QoS Flow is also used to exchange information between the TSN Translator and the TSN Translator Client via the wireless link. An example information exchange is, when the CNC sends the bridge configuration parameters to the 3GPP bridge (TSN translator), the TSN translator forwards the corresponding configuration parameters, like time window in which to expect the data packet at a specific ingress port, to the TSN translator client.

4. The TSN Translator Client provides a blocked security port to the TSN End Station A, which allows only authentication related messages to be sent to the TSN CUC.

5. When the TSN End Station A detects the blocked security port it sends an Authentication Request via the TSN translator client, the 3GPP network, and the TSN translator to the TSN CUC. Once the TSN translator client detects that TSN End Station A is authenticated by the TSN CUC, the TSN Translator Client opens the port for the other UP and CP TSN network communication. The TSN translation client may detect the authentication when it translates the respective message received from TSN CUC via TSN translator and 3GPP network. The respective traffic may use a different PDU session and different QoS flows. More details are described in FIG. 6.

The flow in FIG. 5 is as follows:

1. In the upper part of FIG. 5, the LLDP protocol is executed by the TSN Bridges and the TSN End Stations A and B through which they learn about the TSN network from their direct neighbors. The LLDP protocol is executed in a regular time interval so that the actual information about the neighboring stations is available and up to date [6]. The TSN Translator on the TSN network side and the TSN Translator Client on the TSN End Station A side also support the LLDP protocol and additionally exchange their TSN Bridge capabilities with the neighbors of the TSN network. LLDP protocol runs on links between bridges and end stations [6]. Link partners use this protocol to exchange physical port information with their direct peers. Such information includes e.g.:

source port MAC address—MAC address of the sending port (either of end station or bridge)

destination address—indicates that LLDP packets reach only the immediate link partner operating mode—"Transmit only" for end stations and "Transmit and Receive" for bridges as they can also receive LLDP packets, collect information about their peers and store it in Managed Objects Chassis ID Subtype, Port ID Subtype etc.

Each bridge learns the connection information about their immediate peers (i.e. other bridges and connected end stations), store such information in Managed Objects that can be read by e.g. CNC using a Network Management protocol. In order to build overall network physical topology, the CNC reads for every bridge and for every port of a bridge the Managed Object information describing bridge connections. Managed Objects of bridges store also the performance metric information such as Bridge Delay and Propagation Delay which can be read by CNC while crawling the network to discover connectivity information.

2. The lower part of FIG. 5 shows how the TSN network is discovered by the TSN CNC when initiated by the TSN CUC. The discovery information is used afterwards by the TSN CNC to compute the TSN schedule for a network path. During the discovery process, the TSN CNC will crawl through all the TSN bridges to collect information about the links they are connected to, their capacity, propagation delay, bridge delay and the devices attached to the ports available to them, from the bridge managed objects. Since the 3GPP network appears as a virtual TSN bridge to the TSN CNC, the TSN Translator and its TSN Translator Client manages corresponding bridge objects so that the TSN CNC can read this information.

The ports of the virtual TSN Bridge offered to the TSN End Station A are handled by the TSN Translator Client and the ports on the 3GPP core network side are handled by the TSN Translator. At least one PDU session in 3GPP network represents the connection between one ingress port and one egress port of the virtual TSN Bridge. A PDU session's QoS flows with the different QoS parameters are analogous to the QoS parameters of the TSN network by means of mapping done by TSN Translator.

3. Triggered by the network discovery request issued by TSN CNC, the TSN Translator requests the establishment of at least one PDU session with the respective QoS flows pre-defined (e.g., default QoS) for the TSN End Station A that is associated with the UE in order to reserve the required resources in the 3GPP network for the UP traffic.
4. After establishing the PDU session, the 3GPP Network sends an acknowledgment ('ACK') to the TSN Translator with the confirmed PDU session and QoS flow parameters of the established session. The TSN Translator maps the received information to corresponding so-called 'bridge delay' managed object parameters which can be returned to the TSN CNC as a response to the network discovery request.
5. In some embodiments, the TSN translator may additionally request an indication of the port opened by the TSN translator client for communication with the TSN end station. In some embodiments, the port may be predefined such that the request for the port is not needed. The TSN translator may request PDU session setup and the information on the port in an arbitrary sequence. The requests may be performed fully or partly in parallel.

The TSN CNC forwards the discovery information, as received from the TSN translator, to the TSN CUC.

The flow of FIG. 6 is as follows:
1. The TSN CUC reads the QoS parameters and stream requirements from the TSN End Stations A and B. This information and the information on the TSN End Stations A and B (e.g. medium access control (MAC) addresses) to be connected are then provided to the TSN CNC. The TSN CNC computes the scheduling related parameters for the TSN Bridges and the End Stations according to the TSN procedures shown in FIG. 1 and communicates the result to the TSN CUC.
2. When the TSN Translator receives the schedule and the information of the selected Managed Objects it checks whether or not changes are needed in the 3GPP network. Such changes may include for instance that some PDU sessions are not used or some QoS flows are not needed or require different QoS parameters. In such a case the TSN Translator triggers the 3GPP Network to close not used PDU session(s), QoS flow(s), and/or update QoS flow parameters respectively. As mentioned above this may be necessary to release the resources, which were reserved during the TSN network discovery shown in the lower part of FIG. 5.
3. When the TSN CNC has received the acknowledgements from the TSN Bridge(s) and the TSN Translator it informs the TSN CUC.
4. The TSN CUC configures the TSN End Stations A and B with the computed scheduling related parameters and finally initiates the start of the message transfer at the End Station A at a specified time.

Figure 8:
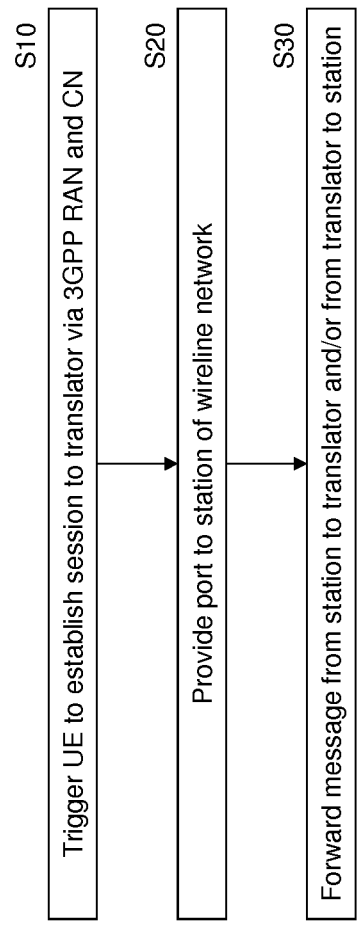
FIG. 8 shows a method according to an embodiment of the invention.
Figure 7:
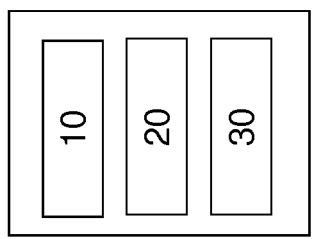
FIG. 7 shows an apparatus according to an embodiment of the invention.

FIG. 7 shows an apparatus according to an embodiment of the invention. The apparatus may be a translator client, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for triggering 10, means for providing 20, and means for forwarding 30. The means for triggering 10, means for providing 20, and means for forwarding 30 may be a triggering means, providing means, and forwarding means, respectively. The means for triggering 10, means for providing 20, and means for forwarding 30 may be a trigger, provider, and forwarder, respectively. The means for triggering 10, means for providing 20, and means for forwarding 30 may be a triggering processor, providing processor, and forwarding processor, respectively.

The means for triggering 10 triggers a terminal of a wireless network to establish a session (such as a control session) to a translator device via the wireless network (S10). The translator device may be a TSN translator device. The terminal may be a UE, an internet of things (IoT) device, etc.

The means for providing 20 provides a port (such as a control port) to a station of a wireline network (S20).

The means for forwarding 30 forwards a first message from the station received on the port via the session to the translator device and/or forwards a second message received via the session from the translator device to the station (S30).

Figure 10:
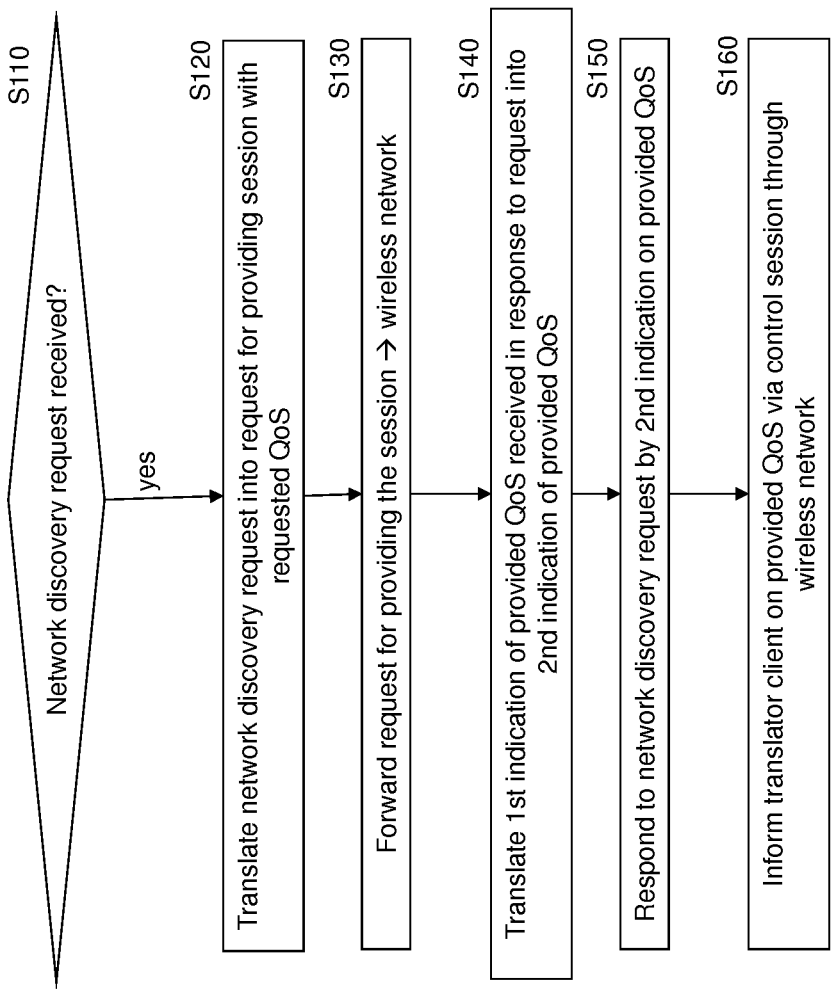
FIG. 10 shows a method according to an embodiment of the invention.
Figure 9:
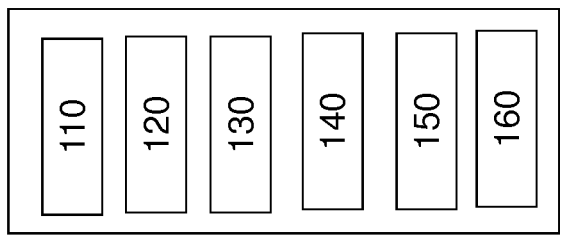
FIG. 9 shows an apparatus according to an embodiment of the invention.

FIG. 9 shows an apparatus according to an embodiment of the invention. The apparatus may be a translator, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for monitoring 110, first means for translating 120, means for forwarding 130, second means for translating 140, means for responding 150, and means for informing 160. The means for monitoring 110, first means for translating 120, means for forwarding 130, second means for translating 140, means for responding 150, and, and means for informing 160 may be a monitoring means, first translating means, forwarding means, second translating means, responding means, and informing means, respectively. The means for monitoring 110, first means for translating 120, means for forwarding 130, second means for translating 140, means for responding 150, and means for informing 160 may be a monitor, first translator, forwarder, second translator, responder, and informer respectively. The means for monitoring 110, first means for translating 120, means for forwarding 130, second means for translating 140, means for responding 150, and means for informing 160 may be a monitoring processor, first translating processor, forwarding processor, second translating processor, responding processor, and informing processor, respectively.

The means for monitoring 110 monitors if a network discovery request is received from a wireline network (S110). The network discovery request requests an indication about a quality of service on a connection to a station of the wireline network.

The first means for translating 120 translates the network discovery request into a request for providing a session (such as a data session) of a wireless network having a requested quality of service (S120). The requested quality of service may be predefined.

The means for forwarding 130 forwards the request for providing the session to the wireless network (S130).

If a response to the request for providing the data session of S130 is received from the wireless network, the second means for translating 140 translates a first indication of a provided quality of service received from the wireless network into a second indication of the provided quality of service of the session (S140).

The means for responding 150 responds to the network discovery request by a response to the network discovery request (S150). The response to the network discovery request comprises the second indication about the provided quality of service of the session. In addition, in some embodiments, it may comprise an identifier of the session, and an identifier of the port used by the TSN translator client to communicate with the station.

The means for informing 160 informs a translator client on the provided quality of service (S160). E.g., the means for informing 160 may provide one or both of the first indication and the second indication of the provided quality of service to the translator client. The means for informing 160 provides the information on the provided quality of service to the translator client via a control session established through the wireless network to the translator client.

FIG. 11 shows an apparatus according to an embodiment of the invention. The apparatus may be a TSN translator or a TSN translator client, or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for translating 210. The means for translating 210 may be a translating means. The means for translating 210 may be a translator. The means for translating 210 may be a translating processor.

The means for translating 210 translates commands received from a wireline network into corresponding commands to a wireless network and/or translates commands received from the wireless network into corresponding commands to the wireline network (S210). From a perspective of the wireline network, the commands received from the wireline network are commands directed to a bridge or a station of the wireline network and the commands directed to the wireline network are commands directed to the bridge and the station, respectively, of the wireline network. From a perspective of the wireless network, the commands directed to the wireless network are commands from an application function running on the wireless network and the commands received from the wireless network are commands to the application function.

FIG. 13 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform the method according to one of FIGS. 8, 10, and 12.

Some embodiments of the invention are described with respect to a 3GPP network. However, the invention is not limited to 3GPP networks. It may be applied to other wireless networks such as a Wi-Fi® network, too.

Some embodiments of the invention are described with respect to an industrial TSN network. However, the invention is not limited to industrial TSN networks. It may be applied to other (non-industrial) TSN networks and to other fixed line networks, too.

FIG. 2 shows an embodiment where one of the TSN bridges is replaced by a 3GPP network embedded between TSN translator and TSN translator client. In general, one or more or even all bridges of the TSN network may be replaced by respective 3GPP networks embedded between respective TSN translator and TSN client. In case of plural replaced bridges, some or all of the respective 3GPP networks may be the same (i.e. one 3GPP network), wherein different replaced TSN bridges correspond to different sets of PDU sessions in the 3GPP network (i.e., a single TSN bridge corresponds to one set of PDU sessions, wherein each set may comprise one or more PDU sessions). In addition, the respective UE may be the same or different for different replaced TSN bridges.

According to FIG. 4, the end station A is authenticated by TSN CUC before TSN translator client fully opens the port. However, in some embodiments of the invention, authentication by TSN CUC may be omitted and TSN translator fully opens the port for end station A once the same is up and running and the UE is authenticated in the 3GPP network. This might be useful in particular if UE is integrated with TSN end station A. In this case, one authentication may be sufficient.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a translator or a translator client, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising at least one processor and at least one memory containing computer program code, the at least one processor, with the at least one memory and the computer program code, being arranged to cause the apparatus to:

trigger a terminal of a wireless network to establish a control session to a translator device via the wireless network;

provide a control port to a station of a wireline network;

forward at least one of a first message from the station received on the control port via the control session to the translator device or a second message received via the control session from the translator device to the station;

monitor if station physical port information is received from the station; and forward the station physical port information to the translator device via the control session if the station physical port information is received.

2. The apparatus according to claim 1, wherein the at least one processor, with the at least one memory and the computer program code, are arranged to cause the apparatus to:

provide the control port as a blocked security port, wherein the blocked security port is open for authentication related communication and blocked for another communication; and wherein the first message from the station is a request for authentication by the wireline network; and the at least one processor, with the at least one memory and the computer program code, are further arranged to cause the apparatus to:

monitor if an authentication response is received in the control session, wherein the authentication response indicates that the wireline network authenticates the station; and open the control port for the other communication if the authentication response is received.

3. The apparatus according to claim 1, wherein the at least one processor, with the at least one memory and the computer program code, are further arranged to cause the apparatus to:

monitor if device physical port information is received via the control session; and forward the device physical port information to the station if the device physical port information is received.

4. The apparatus according to claim 1, wherein the at least one processor, with the at least one memory and the computer program code, are further arranged to cause the apparatus to:

monitor if a bridge configuration parameter is received via the control session; and configure a data port according to the bridge configuration parameter, wherein the data port is configured for data transmission to and from the station.

5. The apparatus according to claim 1, wherein the at least one processor, with the at least one memory and the computer program code, are arranged to cause the apparatus to:

trigger the terminal to establish the control session to the translator device by triggering the terminal to establish a connection via the wireless network to the translator device prior to triggering to establish the control session.

6. The apparatus according to claim 1, wherein the at least one processor, with the at least one memory and the computer program code, are further arranged to cause the apparatus to:

monitor if a network discovery request is received from the wireline network, wherein the network discovery request requests an indication about a quality of service on a connection to the station of the wireline network;

translate the network discovery request into a request for providing a data session of the wireless network having a requested quality of service;

forward the request for providing the data session to the wireless network;

translate a first indication of a provided quality of service of the data session comprised in a response to the request for providing the data session received from the wireless network into a second indication of the provided quality of service of the data session;

respond to the network discovery request by a response to the network discovery request, and inform a translator client on the provided quality of service of the data session via the control session established through the wireless network to the translator client, wherein the response to the network discovery request comprises the second indication about the provided quality of service of the data session.

7. The apparatus according to claim 6, wherein the requested quality of service is predefined.

8. The apparatus according to claim 6, wherein the at least one processor, with the at least one memory and the computer program code, are further arranged to cause the apparatus to:

request, via the control session to the translator client, an indication of a port at the translator client, wherein the port is provided for communication with the station, wherein the response to the network discovery request comprises the second indication about the provided quality of service of the data session, and an identifier of the port.

9. The apparatus according to claim 6, wherein the at least one processor, with the at least one memory and the computer program code, are further arranged to cause the apparatus to:

monitor if a first request for a modification of the data session is received from the wireline network;

translate the first request for the modification into a second request for the modification according to the wireless network;

forward the second request for modification to the wireless network; and inform the translator client on the modification.

10. The apparatus according to claim 6, wherein the at least one processor, with the at least one memory and the computer program code, are further arranged to cause the apparatus to:

monitor if at least one of device physical port information and a bridge configuration parameter is received from a first device of the wireline network; and forward the at least one of the device physical port information and the bridge configuration parameter to the translator client if the at least one of device physical port information and the bridge configuration parameter is received.

11. The apparatus according to claim 10, wherein the at least one of the device physical port information and the bridge configuration parameter comprises the bridge configuration parameter, and wherein the at least one processor, with the at least one memory and the computer program code, are further arranged to cause the apparatus to:
configure a data port according to the bridge configuration parameter, wherein the data port is configured for data transmission to and from the wireline network.

12. The apparatus according to claim 6, wherein the at least one processor, with the at least one memory and the computer program code, are further arranged to cause the apparatus to:
monitor if station physical port information is received from the translator client; and
forward the station physical port information to a second device of the wireline network if the station physical port information is received.

13. The apparatus according to claim 1, wherein the at least one processor, with the at least one memory and the computer program code, are further arranged to cause the apparatus to:
translate at least one of commands received from a bridge and a station, respectively, of a wireline network into corresponding commands to a wireless network and commands received from the wireless network into corresponding commands to the bridge and the station, respectively, of the wireline network, wherein
from a perspective of the wireless network, the commands directed to the wireless network are commands from an application function running on the wireless network and the commands received from the wireless network are commands to the application function.

14. The apparatus according to claim 13, wherein the at least one processor, with the at least one memory and the computer program code, are further arranged to cause the apparatus to:
translate at least one of messages received from the bridge and the station, respectively, of the wireline network into corresponding messages to the wireless network and messages received from the wireless network into corresponding messages to the bridge and the station, respectively, of the wireline network, wherein
from the perspective of the wireless network, the messages directed to the wireless network are messages from a packet data network communicating with the wireless network and the messages received from the wireless network are messages to the packet data network.

15. The apparatus according to claim 1, wherein at least one of
the wireline network is a time sensitive network, and
the wireless network is a 3GPP network.

16. Method, comprising
triggering a terminal of a wireless network to establish a control session to a translator device via the wireless network;
providing a control port to a station of a wireline network;
forwarding at least one of a first message from the station received on the control port via the control session to the translator device or a second message received via the control session from the translator device to the station;
monitoring if station physical port information is received from the station; and
forwarding the station physical port information to the translator device via the control session if the station physical port information is received.

17. The method according to claim 16, further comprising
monitoring if a network discovery request is received from the wireline network, wherein the network discovery request requests an indication about a quality of service on a connection to the station of the wireline network;
translating the network discovery request into a request for providing a data session of the wireless network having a requested quality of service;
forwarding the request for providing the data session to the wireless network;
translating a first indication of a provided quality of service of the data session comprised in a response to the request for providing the data session received from the wireless network into a second indication of the provided quality of service of the data session;
responding to the network discovery request by a response to the network discovery request, and
informing a translator client on the provided quality of service of the data session via the control session established through the wireless network to the translator client, wherein
the response to the network discovery request comprises the second indication about the provided quality of service of the data session.

18. A computer program product comprising a non-transitory computer readable medium and a set of instructions which, when executed on an apparatus, is configured to cause the apparatus to:
trigger a terminal of a wireless network to establish a control session to a translator device via the wireless network;
provide a control port to a station of a wireline network;
forward at least one of a first message from the station received on the control port via the control session to the translator device or a second message received via the control session from the translator device to the station;
monitor if station physical port information is received from the station; and
forward the station physical port information to the translator device via the control session if the station physical port information is received.

* * * * *